United States Patent [19]

Matsumoto

[11] 4,019,817
[45] Apr. 26, 1977

[54] METHOD OF COLOR IMAGE RECORDING

[75] Inventor: Kazuya Matsumoto, Yokohama, Japan

[73] Assignee: Canon Kabushiki Kaisha, Tokyo, Japan

[22] Filed: May 7, 1975

[21] Appl. No.: 575,245

Related U.S. Application Data

[63] Continuation of Ser. No. 400,554, Sept. 25, 1973, abandoned.

[30] Foreign Application Priority Data

Sept. 28, 1972 Japan .............................. 47-97797

[52] U.S. Cl. ...................................... 355/132; 96/2; 352/66; 355/88
[51] Int. Cl.² ........................................ G03B 27/08
[58] Field of Search .............. 95/12.2, 12.21, 18 R, 95/18 P, 36; 355/2, 88, 95, 90, 79, 96, 132; 350/162 SF, 3.5; 352/45, 66, 77; 96/2, 22, 24–26, 27 E, 27 H, 45, 45.2, 116, 117; 354/100, 102, 103, 110, 124

[56] References Cited

UNITED STATES PATENTS

| | | | |
|---|---|---|---|
| 2,024,522 | 12/1935 | Harrison | 96/2 X |
| 2,052,625 | 9/1936 | Harrison | 350/162 SF |
| 2,164,062 | 6/1939 | Grimson | 352/45 X |
| 3,504,606 | 4/1970 | Macovski | 95/12.2 |
| 3,663,221 | 5/1972 | Higgins et al. | 96/45 X |
| 3,664,248 | 5/1972 | Mueller | 95/12.2 |

Primary Examiner—L. T. Hix
Assistant Examiner—Kenneth C. Hutchison
Attorney, Agent, or Firm—Fitzpatrick, Cella, Harper & Scinto

[57] ABSTRACT

A color image carrier such as positive film is brought into contact with a monochrome recording medium such as silver salt film. The color image carrier is illuminated with red, green and blue beams. These three color beams respectively can project coded information about diffraction gratings or slits which are different in angle or pitch in accordance with the respective colors. Thus, each color image carrier containing the coded information about each diffraction grating or slit is recorded on the monochrome recording medium.

8 Claims, 16 Drawing Figures

PRIOR ART
FIG. 1
PRIOR ART
FIG. 3
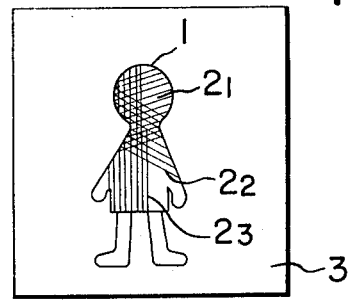
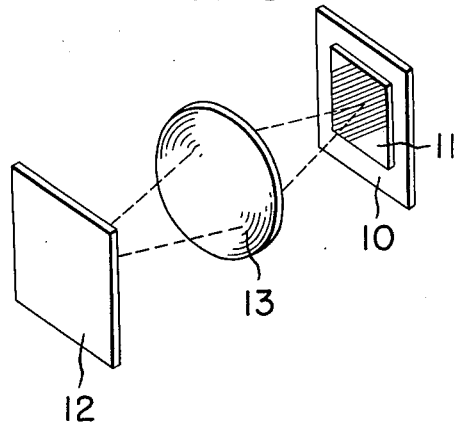
PRIOR ART
FIG. 2
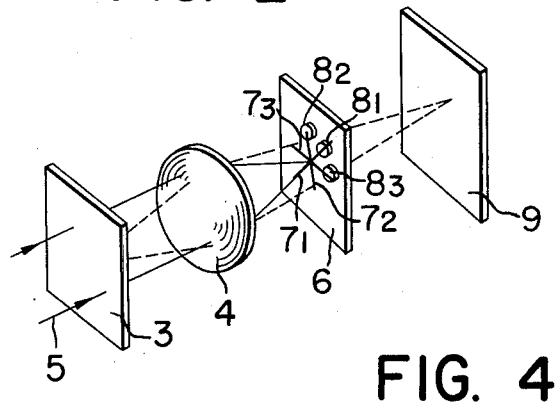
FIG. 4
PRIOR ART
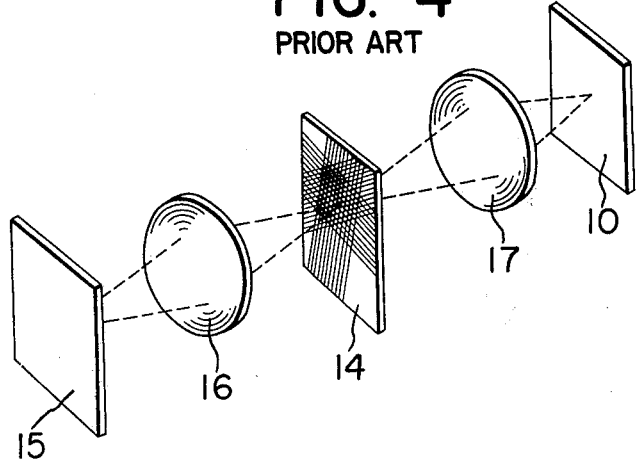

METHOD OF COLOR IMAGE RECORDING

This is a continuation, of application Ser. No. 400,554, filed Sept. 25, 1973, now abandoned.

BACKGROUND OF THE INVENTION

1. Field of the Invention

This invention relates to a method of color image recording, and more particularly to carrier frequency photography.

2. Description of the Prior Art

The carrier frequency photography is said to have been created by Wood in 1899 as a method of recording color photographs on a monochrome dry plate. For the history of carrier frequency photography, see K. Biedremann, *Optica Acta* 17 (1890), page 631.

In such carrier frequency photography, recording of color images has been done by contacting a diffraction grating with a monochrome recording medium such as silver salt film or the like, and projecting a red, green or blue image upon the diffraction grating each time the angle or pitch of the grating is changed, thereby recording color images.

Such a prior art method, which comprised contacting a diffraction grating with a monochrome recording medium and rotating the diffraction grating, necessarily involved difficulties in positioning the diffraction grating. Further, projection of color images upon the diffraction grating involved difficulties in focusing the images. This raised a problem, especially when carrying out the recording at high speeds.

SUMMARY OF THE INVENTION

It is an object of the present invention to provide a method of color image recording, which has eliminated the above-noted disadvantages.

It is another object of the present invention to provide a method of color image recording whereby a color image carrier is brought into contact with a monochrome recording medium, and a beam containing coded information about the diffraction grating is projected upon the color image carrier, thereby recording color images on the recording medium.

It is still another object of the present invention to provide a method of color image recording whereby a color image carrier is brought into conatct with a monochrome recording medium and the image of a diffraction grating is projected upon the color image carrier through a photographic optical system, thereby recording the color images on the monochrome recording medium.

It is yet another object of the present invention to provide a method of color image recording whereby a color image carrier is brought into contact with a monochrome recording medium and interference fringes are formed on the color image carrier, thereby recording color inages on the monochrome recording medium.

In accordance with the present invention, the diffraction grating is not brought into contact with the monochrome recording medium, and this eliminates the necessity of changing the angle or pitch of the diffraction grating to position such grating.

Also, in accordance with the present invention, it is the color image carrier which is brought into contact with the monochrome recording medium, and this enables a number of color images to be continuously recorded at high speeds.

Other objects and features of the present invention will become fully apparent from the following detailed description of some embodiments as shown in the accompanying drawings.

BRIEF DESCRIPTION OF THE DRAWINGS

FIGS. 1, 2 and 3 illustrate a method according to the prior art, FIG. 1 being a plan view of a monochrome film bearing a recorded image corresponding to a color image, FIG. 2 being a schematic perspective view illustrating the manner in which the recorded image is reproduced into a color image, and FIG. 3 being a schematic perspective view illustrating the manner in which a color image is recorded on a monochrome film.

FIG. 4 schematically illustrates another recording method according to the prior art.

DESCRIPTION OF THE PREFERRED EMBODIMENTS

Figure 5:
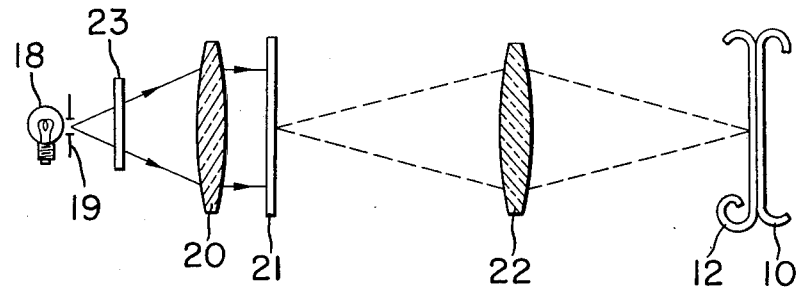
FIG. 5 schematically shows an embodiment of the present invention.

Before describing various embodiments of the present invention, the carrier frequency photography according to the prior art will be considered with reference to FIGS. 1 to 4.

A sheet of monochrome film is designated by numeral 3 and bears a recorded image 1 representing a color image. The recorded image consists of portions presenting different sets of lines related to diffraction grating structures having different angles of inclination corresponding to respective colors of the color image. For example, a portion designated by $2_1$ represents blue, a portion $2_2$ represents green, and a portion $2_3$ represents red. More specifically, the illustrated film has recorded thereon coded information about the shape of the color image and information about the colors of such image provided by diffraction gratings having different angles of inclination. Half-tone coded information is recorded by overlaps of the diffraction gratings.

How to reproduce the film 3 is illustrated in FIG. 2. In this figure, numeral 4 designates an optical system for projecting an image containing coded information. Numeral 5 designates a parallel light beam from a white light source for illuminating the film 3, and numeral 6 denotes a space filter disposed in the focal plane of the optical system 4. Numerals $7_1$–$7_3$ designate spectral lines of diffracted light representing the diffraction gratings recorded on the film 3. Color filters $8_1$–$8_3$ are disposed at the positions corresponding to the desired degrees of diffracted light in the spectra $7_1$–$7_3$. These color filters are red, green and blue, respectively. A screen 9 is disposed in a conjugate plane of the film 3.

When the film 3 is illuminated with white light 5, the diffraction lines $2_1$–$2_3$ (FIG. 1), corresponding to the types of coded color information about the color image, may produce respective diffracted lights. These diffracted lights form lines of spots in the focal plane in accordance with the degrees of diffraction, However, any degree of diffracted light, other than the desired degrees, is removed by the space filter 6. The desired degrees of diffracted light pass through the color filters $8_1$–$8_3$ and are colored thereby. These colored lights form a color image on the screen 9. For further details of such carrier frequency photography, refer to U.S. Pat. No. 2,050,417 issued to Carlo Bocca on Aug. 11, 1936.

FIG. 3 illustrates a known method of preparing such a film 3 as shown in FIGS. 1 and 2. There is seen an unexposed monochrome film 10 which is contacted by a diffraction grating 11. The diffraction grating may preferably be black. Numeral 13 designates a projection optical system, and numeral 12 denotes one of the picture elements obtaned by color-resolving a color image into three colors, red, green and blue.

With such an arrangement, the diffraction grating 11 is changed in its angle of inclination (i.e., rotated in its plane perpendicular to the optical axis) for each picture element 12 and the images of the respective picture elements 12 are successively projected through the photographic lens 12 and recorded on the film 10.

FIG. 4 illustrates another known method which is distinct from that of FIG. 3. This method is characterized in that it uses an ordinary positive film which has not been color-resolved, and in that it requires no change in the angle of inclination of the diffraction grating, and in that the diffraction grating need not be brougjt into contact with the monochrome film.

The arrangement shown in FIG. 4 includes an ordinary positive film 15, a photographic lens system 16, and a diffraction grating 14 upon which the positive film is projected through the lens 16. Numerals 17 and 10 designate a projecting optical system and a monochrome film, respectively.

With this arrangement, the coded information about one color of the positive film 15 is recorded on the film 10, including only the coded information about the diffraction grating representing said one color.

In either of the known methods described above with respect to FIGS. 3 and 4, a color image is projected upon a diffraction grating which is optically in contact with the surface of the monochrome film, thereby providing a coded monochrome film.

Unlike these known methods, the present invention brings a color image carrier film into intimate contact with a monochrome film and projects thereon a coded pattern of diffraction grating or the like, thus coding the color image on the monochrome film. An advantage of the present invention over the prior art methods is that the intimate contact of the color image carrier film with the monochrome film contributes to great simplification of the apparatus for effecting high-speed image transfer, for example, from a long footage of film to a corresponding length of monochrome film to thereby produce a coded film. Further, in accordance with a method using projection of interference fringes according to another embodiment of the present invention, the necessity of focusing the projected pattern may be eliminated to enable highly efficient production of coded film.

Various embodiments of the present invention will now be described with reference to FIG. 5 and so forth.

FIG. 5 shows a first embodiment of the present invention. There is provided a white light source 18, a pin hole 19, a collimating lens 20, and a diffraction grating or slit 21. The diffraction grating may preferably be black. There is further provided a projecting optical system 22, and a color image carrier film 12, such as positive film or the like, which is substantially in intimate contact with a recording medium 10 such as monochrome film, photoresist, thermoplastics, chalocogen glass, photochromic glass, or the like, The film 12 and the recording medium 10 are transported by an intermittent transport mechanism, not shown. Numeral 23 designates one of three red, green and blue color filters, which is held by a holder, not shown.

With such an arrangement, a color image may be recorded on the recording medium 10 as shown in FIG. 1 by successively interchanging the color filter 23 and changing the inclination of the diffraction grating by means of rotatable means, not shown. During interchange of the color filter 23, the light source 8 should desirably be turned off by switch means. The recording medium having thus recorded thereon an image representing the color image may reproduce the color image by the known method of reproduction described above with respect to FIG. 2.

Figure 6:
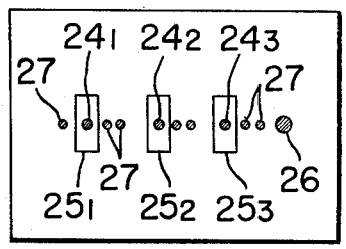
FIG. 6 illustrates the spectral distribution and the filter arrangement in the embodiment of FIG. 5.

On the other hand, the color image may also be recorded by interchanging the filter and changing the pitch of the diffraction grating 21 accordingly. That is, where diffraction gratings of different pitches are used, (i.e., gratings having a different number of lines per inch), the spectra of respective picture elements (colors) appearing in the focal plane through the lens 4 of FIG. 2 are spaced apart from one another in one direction as shown in FIG. 6. Therefore, by disposing color filters $25_1$, $25_2$ and $25_3$ in superposed relationship with spectra $24_1$, $24_2$ and $24_3$ corresponding to the respective types of coded color information so that the respective filters pass therethrough solely the respective lights, and by intercepting the other degrees of diffracted light such as zero degree of diffracted light 26 and cross-talk diffracted light 27, there may be viewed a color image on the screen 9 in FIG. 2. Thus, as depicted in FIG. 6, the use of three separate diffraction plates each having a different pitch, results in a projection of zero diffraction light 26 and three groups of diffracted beams. The groups correspond respectively to the different gratings wherein the beams within each group correspond to the different diffraction directions resulting from the different frequencies of the color components of the light. The cross-talk diffracted light 27 results when the diffraction grating structures representing respective types of coded color information recorded on the recording medium are illuminated with white light 5, e.g. when an image having a diffraction grating structure corresponding to red color coded information is illuminated with a non-red light such as blue or green light, and such cross-talk diffracted light is deleterious for the reproduction of the recorded color image. Therefore, such cross-talk diffracted light must be intercepted.

The present embodiment is advantageous over the methods of the prior art in that the prior art methods required two systems for synchronously transporting two films to code and transfer color images from a long footage of color film to a corresponding length of monochrome film, whereas the present embodiment permits these two films to be transported in intimate contact with each other by a single transport system, and this leads to simplification of the image transfer device as well as highly efficient and highly accurate image transfer. Further, the prior art methods required the respective color picture elements of the two films to be positioned relative to each other with a high precision, whereas the present embodiment eliminates the necessity of such positioning because the two films are in intimate contact.

Figure 7:
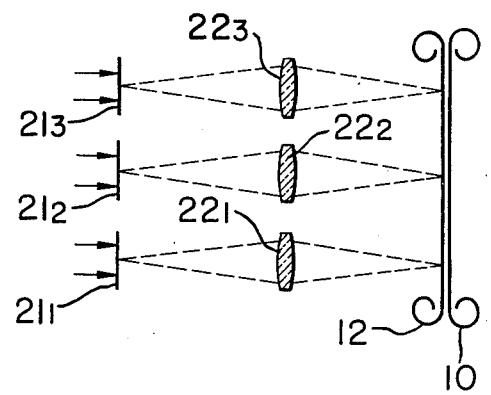
FIG. 7 shows another embodiment of the present invention in which the single color components images of a color image are recorded simultaneously.

FIG. 7 shows an embodiment in which the transport of two films 12 and 10 in intimate contact is utilized to continuously transfer the color images recorded on the film 12 to the film 10. As shown three diffraction gratings $21_1$, $21_2$ and $21_3$ with different angles of inclination are juxtaposed and three lenses $22_1$, $22_2$ and $22_3$ are provided to correspond to the respective diffraction gratings so that the diffraction gratings may be illuminated individually with red, green and blue light beams, respectively, to project the three color images of the three diffraction gratings upon different areas of the color film 12 through the respective lenses. In this way, three types of coded color information can be successively and continuously recorded by intermittently transporting the color film 12 and the monochrome film 10 in intimate contact with each other. The intermittent transport means for effecting the successive and continuous transport may be similar to a film transport mechanism employed in cinecameras, or the like. Also, it is desirable to effect the recordng with the light source turned on in synchronism with the stoppage of the film being transported by the intermittent transport mechanism.

Figure 8:
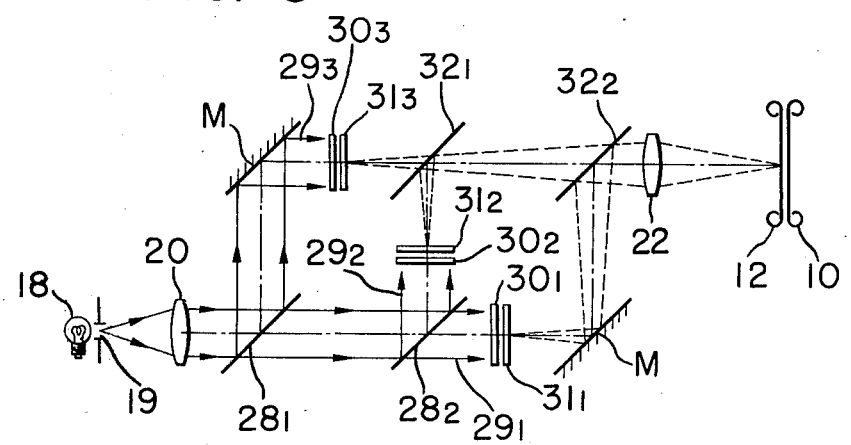
FIG. 8 shows a further embodiment of the present invention in which the component images of a color image are recorded simultaneously at one position.

FIG. 8 shows an embodiment in which image recording is effected by simultaneously by projecting three types of coded color information upon a portion of the monochrome film 10. A light beam emitted from white light source 18 is made into a substantially parallel beam through pin hole 19 and lens 20 and passes through beam splitters $28_1$ and $28_2$, which split the beam into three beams $29_1$, $29_2$ and $29_3$. Color filters $30_1$, $30_2$ and $30_3$ and diffraction gratings $31_1$, $31_2$ and $31_3$, different in angle of inclination, are inserted in the paths of the three beams, respectively, and further beam splitters $32_1$ and $32_2$ are disposed so as to reunite the three beams into a single beam, which is then passed through lens 22 so that the images of the three diffraction gratings $31_1$, $31_2$ and $31_3$ are projected upon the color film 12 which is placed in intimate contact with the monochrome film 10. In this arrangement, it should be understood that the optical paths from the lens 22 to the respective diffraction gratings $31_1$, $31_2$ and $31_3$ are adjusted to an equal length.

Figure 9:
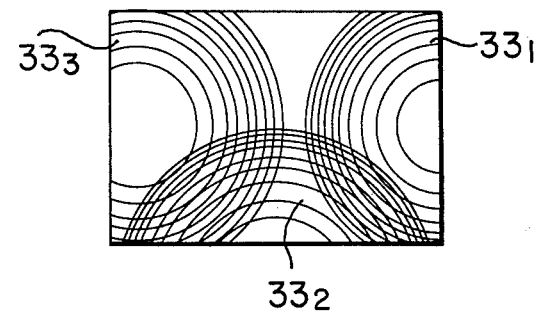
FIG. 9 shows a zone plate employed as a projection pattern.

In the embodiments described hitherto, only the diffraction grating pattern has been adopted as the coded color information pattern, but the coded color information pattern may also be an offset zone plate pattern as shown in FIG. 9, In the latter case, since the zone plate itself performs a condensing function, the information carrier lights corresponding to the respective colors are condensed by such zone plate being illuminated with a parallel light beam containing three color lights, during reproduction of the color image, and this eliminates the use of the lens 4 (FIG. 2) for separating the coded color information as in the previous embodiments. In the zone plate of FIG. 9, offset zones $33_1$, $33_2$ and $33_3$ corresponding to the respective colors are offset in different directions so that the information carrier lights representing the respective colors may be condensed at different points in a common plane, for example. Some of the diffraction lines of each of the three zones in FIG. 9 have been omitted for purposes of clarity, and it is to be understood that the open area at the top of FIG. 9 would be filled with lines.

A further embodiment of the present invention will now be described. In the embodiments described so far, recording has been effected by projecting a pattern corresponding to the coded color information such as an image of a diffraction grating, through a lens, upon a color film in intimate contact with a monochrome film, and an incoherent light has been used therein.

However, the recording method using such a projection of the pattern is not the only possible method as the recording may also be achieved by projecting upon the coded color film an image an interference fringe pattern formed by a pair of coherent lights, and this latter method enjoys various advantages which could not result from the use of a lens.

Figure 10:
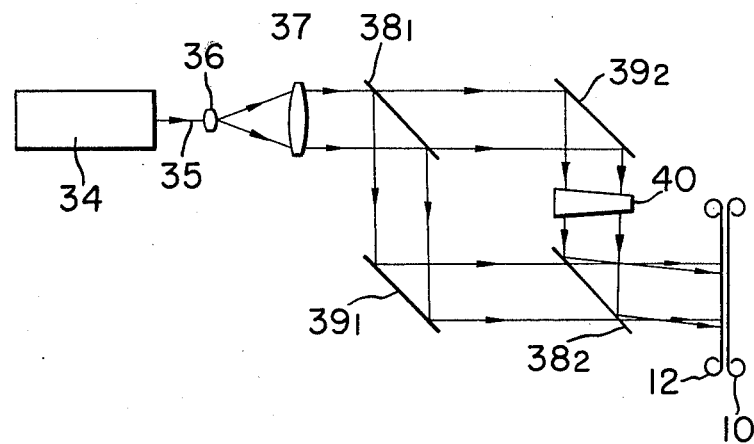
FIG. 10 schematically shows another embodiment of the present invention in which interference fringes are projected.

Referring to FIG. 10, a multicolor light oscillation laser 34 emits a beam 35, which is enlarged through lenses 36 and 37, and then the enlarged beam is directed to a Mach-Zehnder interferometer comprising beam splitters $38_1$, $38_2$ and mirrors $39_1$, $39_2$, which interferometer splits the beam into two beams. These beams are then superposed one upon the other on the beam splitter $38_2$ and passed to the color film 12 placed in intimate contact with the recording medium 10. An optical wedge 40 may be inserted in one of the optical paths within the interferometer so that the two beams may travel to the color film 12 with an angle of inclination relative to each other, therby forming parallel interference fringes of a pitch corresponding to the angle of inclination. Such interference fringes include a plurality of interference fringes whose pitches are different in accordance with their wavelengths. Such an interference fringe pattern performs the same function as that of the different grating pattern in the embodiment using a lens as previously described in connection with FIG. 5, so that the recording film 10 can provide color images when used with the previously described color image reproducing optical system (such as the one shown in FIG. 2). In the previous embodiment (FIG. 5), different codes have been provided by the rotation of the diffraction grating, whereas in the present embodiment the optical wedge 40, instead of the diffraction grating, may be rotated to change the directions of the interference fringes projected upon the color film, and a prism for selecting the wavelengths of the multicolor laser 34 may be rotated to change the oscillation wavelength of the laser 34, while recording the color images on the recording medium 10. In this case, the diffraction grating structures differ both in pitch and inclination.

Figure 11:
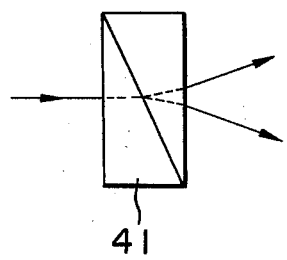
FIG. 11 shows a double refraction crystal.
Figure 12:
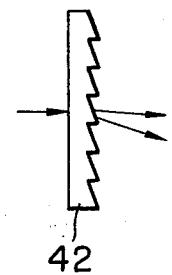
FIG. 12 is a side view of a brazed diffraction grating.

The greatest advantage of the interference fringe projection method is that interference fringes are formed with volumes everywhere in the space, and this completely eliminates the problem of focusing, which is encountered in the method using a lens to form the image of the diffraction grating. Thus, no adjustment of the relative position between the color film and the recording medium is required in the embodiment of the present invention wherein interference fringes are projected upon a color film in intimate contact with a recording medium. This leads to the possibility of efficiently producing a recording medium with color images recorded thereon. The means for projecting two beams in the form of interference fringes as used in the present embodiment is not limited to the described Mach-Zehnder interferometer but use may also be made of a double-diffraction crystal 41 (e.g. Wollaston prism) as shown in FIG. 11 or a brazed diffraction grating 42 as shown in FIG. 12, which produces diffracted waves in only two directions.

Description will now be made of an embodiment which employs an ordinary diffraction grating to project interference fringes. When an ordinary diffraction grating is employed, the resultant interference fringes are multicolor interference fringes, which present a complicated distribution or a non-sinusoidal distribution depending upon the optical distance $d$ between the diffraction grating and the recording medium. However, in the method of recording color images in accordance with the directions of interference fringes, even the interference fringes presenting a complicated or non-sinusoidal distribution can be reproduced into color images without any inconvenience. Also, if the optical distance $d$ satisfies the relation $$d = 2p^2/\lambda,$$

where $p$ is the pitch of the diffraction grating and $\lambda$ is the wavelength, then the self-imaging performance possessed by the diffraction grating enables a perfect image of the grating to be recorded on the recording medium. For example, when a diffraction grating 43 is disposed with its base side 44 in intimate contact with a color film 12 which, in turn, is in intimate contact with a recording medium 10, in the manner as shown in FIG. 3, the pitches of the diffraction grating for respective wavelengths of light required to cause the self-imaging performance of the diffraction grating will be as follows, if $d32\ 500\ \mu m$:

$$p_1 = 10.7\ \mu m, p_2 = 11.6\ \mu m, p_3 = 12.2\ \mu m,$$

where $p_1$, $p_2$ and $p_3$ represent the pitches of red, green and blue diffraction gratings, respectively.

Thus, by determining the pitches of the diffraction gratings for respective wavelengths of light, the images of these diffraction gratings may be formed on the recording medium.

Figure 13:
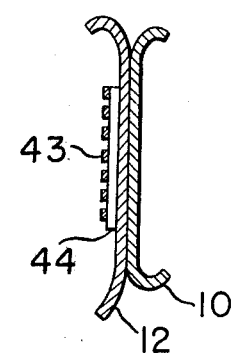
FIG. 13 shows an arrangement of diffraction grating, color film and recording medium in another embodiment of the present invention.

If incoherent light is thrown upon the arrangement shown in FIG. 13 to project the image of a diffraction grating upon the surface of the recording medium 10, there is created some halo in accordance with the optical distance $d$, but where coherent light is used as in the present embodiment, there is an advantage that the image of a diffraction grating spaced apart from the surface of the recording medium 10 can be projected upon the latter surface without any halo being created thereon.

Further, the arrangement of FIG. 13, in which intimate contact is maintained between the diffraction grating 43, the color film 12, and the recording medium 10, is particularly effective to carry out the recording, while continuously transporting a long footage of color film 12 and a corresponding length of recording medium 10.

Figure 14:
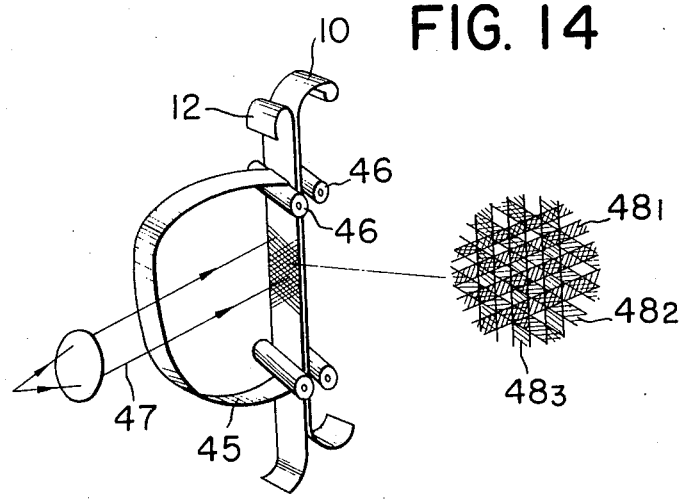
FIG. 14 shows another embodiment in which images are transferred to a long footage of film and shows also a blowup of the construction of the diffraction grating employed therein.

An embodiment using such an arrangement is shown in FIG. 14. There is provided a tri-color diffraction grating 45 having grating structures of different angles of inclination, and a color film 12 and a recording medium 10 are in intimate contact with each other and transported by a set of rotatable rolls 46. The tri-color diffraction grating 45 is in the form of a loop and comprises a diffraction grating structure $48_1$ for passing therethrough blue light alone, a diffraction grating structure $48_2$ for passing therethrough green light alone, and a diffraction grating structure $48_3$ for passing therethrough red light alone. Tri-color light 47 emitted from a laser illuminates the tri-color diffraction grating 45 so that patterns corresponding to the respective types of color information can be provided on the surface of the recording medium 10. With this method, the diffraction grating is moved in timed relationship with the color film, thus achieving continuous recording of color images.

Figure 15:
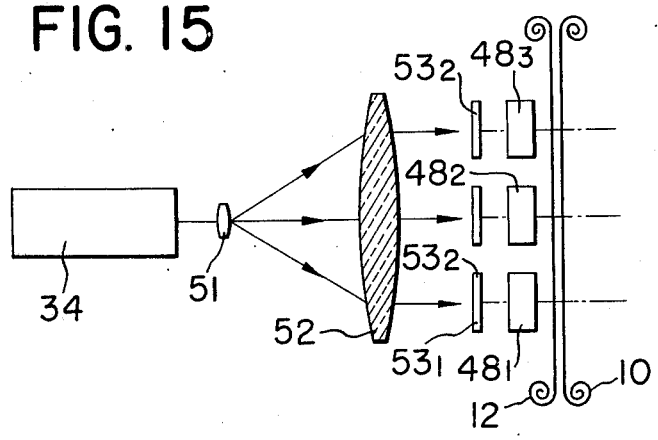
FIG. 15 schematically shows another embodiment in which image transfer is effected to a long footage of film which is being continuously transported.

FIG. 15 shows a further embodiment in which color images can be recorded with color film 12 and recording medium 10 being transported continuously. A progressive wave type ultrasonic wave diffraction grating $48_1$ is disposed closely adjacent to the color film 2, which is in intimate contact with the recording medium 10. This diffraction grating is movable only in one direction and its velocity is synchronous with the velocity of the color film 12. By irradiating this diffraction grating with coherent light, color images may be recorded on the recording medium 10 which is transported at a predetermined velocity. To effect tri-color records in juxtaposed relationship as shown in FIG. 7, three ultrasonic wave diffraction gratings $48_1$, $47_2$ and $48_3$ being different in the direction of the progressive wave, may be disposed in juxtaposed relationship and individually irradiated with coherent tri-color light. A beam as from Kr laser 34 is enlarged by lenses 51 and 52 and passed through three color filters $53_1$, $53_2$ and $53_3$ to irradiate the ultrasonic wave diffraction gratings $48_1 48_2$ and $48_3$.

Although parallel interference fringes alone have heretofore been considered for use as a coherent pattern, the present invention also permits other patterns to be used, as in the case of an incoherent pattern.

Figure 16:
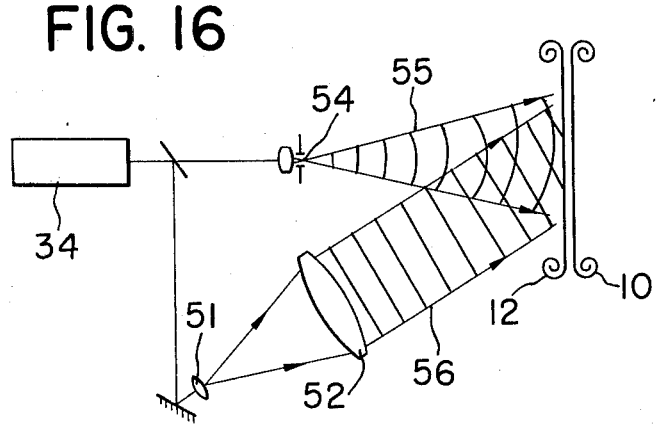
FIG. 16 is a schematic view showing an embodiment in which a spherical wave and a plane wave interfere with each other to produce interference fringes which are utilized as a pattern.

For example, as shown in FIG. 16, interference fringes formed by a plane wave 56 and a spherical wave 55 emitted from a spot 54 may be used as a pattern (which corresponds to the previously described Fresnel zone plate). In such case, the wavelength of light, with which a record is provided on the recording medium 10, is condensed at a single spot 54 by illuminating the recording medium 10 with white light in the direction opposite to the direction of the plane wave 56 during color reproduction, and in view of this, a color filter corresponding to said wavelength of light may be placed in the vicinity of the spot 54 to obtain the recorded coded color information. To record and reproduce three types of coded color information corresponding to three colors, the spot light source 54 may be arranged such that its position is variable for the respective wavelengths of light.

Thus, according to the present invention, a color film and a recording medium are disposed substantially in intimate contact with each other and a diffraction grating image or a zone plate pattern is projected thereupon to enable image transfer to be done simply and at a high accuracy. Also, instead of projecting a diffraction grating image, the present invention utilizes a pattern provided by coherent light, to thereby form interference fringes over a wide area in space, thus eliminating the necessity of focusng the pattern with respect to the recording medium and, accordingly, facilitating the recording of patterns other than parallel striped patterns. Further, the present invention has advantages including potentiality of recording interference fringes three-dimensionally in the recording medium and the possibility of increasing the quantity of diffracted information light.

Furthermore, the present invention is useful to keep records because it provides a high degree of resolving power which results in records free of color fading, and moreover, it can provide copies at a lower cost by using monochrome film. In addition, the recording method of the present invention can record color images with a concave-convex distribution which is usable as a prototype to provide copy images on inexpensive materials such as vinyl chloride or the like by embossing, which is suitable for the mass production of copies.

I claim:

1. A method of recording an object recorded on a color positive film onto a monochrome recording medium as diffraction grating images in respective color components, comprising:
   contacting the color positive film with the monochrome recording medium;
   projecting onto said color positive film, through a plurality of diffraction gratings, a plurality of superimposed component color images correspondng to different diffraction grating images, each corresponding to a color of said object recorded on said color positive film, without changing the relative position between said monochrome recording medium and said color positive film at the time of the projection, and
   passing each of said diffraction grating images through its respective color component portion of said color positive film, and forming diffraction grating images corresponding to said color components on said monochromatic recording medium.

2. A method according to claim 1, wherein each of said diffraction gratings comprise parallel lines, and each said grating has a different line inclination from the others.

3. A method according to claim 2, wherein each of said diffraction gratings has a plurality of spaced lines, wherein the line spacings of each gratings are different from the others.

4. A method according to claim 1, wherein each of said diffraction gratings comprises a zone plate having a plurality of concentric diffraction lines, wherein the centers of each set of concentric lines are spaced apart.

5. A method of recording an object recorded on a color positive film onto a monochromatic recording medium as diffraction grating images of respective color components, comprising:
   contacting the color positive film with the monochromatic recording medium;
   illuminating a diffraction grating with a plurality of different color monochromatic light beams;
   rotating the diffraction grating for each monochromatic light beam to expose the monochromatic recording medium to form a diffraction grating image at each position on said color positive film without changing the relative position between the monochromatic recording medium and the color positive film at the time of the formation, wherein each of said monochromatic diffraction grating images has a different wavelength and a different rotational inclination of grating lines; and
   passing each of said diffraction grating images through its respective color component portion of said color positive film, to form differently inclined diffraction grating images corresponding to said color components on said monochromatic recording medium.

6. A method according to claim 5, wherein the diffraction grating images are formed on the color positive film by means of an image forming optical system.

7. A method of recording an object recorded on a color positive film onto a monochromatic recording medium as diffraction grating images of respective color components, comprising:
   contacting the color positive film with the monochromatic recording medium;
   illuminating a first diffraction grating with a first monochromatic light beam to form a first diffraction grating image on said color positive film;
   illuminating a second diffraction grating with a second monochromatic light beam to form a second diffraction grating image in said color positive film;
   illuminating a third diffraction grating with a third monochromatic light beam to form a third diffraction grating image on said color positive film, wherein said first, second and third grating have different diffraction characteristics and
   each monochromatic diffraction grating image corresponds to a color of said object recorded on said color positive film; and
   passing each of said diffraction grating images through its respective color component portion of said color positive film to form different diffraction grating images corresponding to said color components on said monochromatic recording medium.

8. A method of recording an object recorded on a color positive film onto a monochromatic recroding medium as diffraction grating images of respective color components, comprising:
   contacting the color positive film with the monochromatic recording medium; and
   forming a plurality of interference fringes in front of the surface of the color positive film with coherent light beams having different wavelengths from each other;
   projecting said plurality of monochromatic interference fringes, each having a different wavelength and configuration, on said color positive film, each said monochromatic interference fringe corresponding to a color of said object recorded on said color positive film; and
   passing each of said interference fringes through its respective color component portion of said color positive film, and forming interference fringes corresponding to said color components on said monochromatic recording medium.

* * * * *

UNITED STATES PATENT OFFICE
CERTIFICATE OF CORRECTION

Patent No. 4,019,817　　　　　Dated April 26, 1977

Inventor(s) KAZUYA MATSUMOTO

It is certified that error appears in the above-identified patent and that said Letters Patent are hereby corrected as shown below:

Column 1, line 16, change "Biedremann" to read --Biedermann--;

line 46, change "conatct" to read --contact--;

line 57, change "inages" to read --images--.

Column 5, line 50, delete "by" (second occurrence).

Column 6, line 5, delete "," (first occurrence) and insert --.--;

line 48, change "therby" to read --thereby--;

line 54, delete "different" and insert --diffraction--

Column 7, line 48, delete "3" and insert --13--;

line 51, change "d32 500" to --d=500--.

Column 8, line 33, change "2" to --12--;

line 42, delete "$47_2$" and insert --$48_2$--;

Column 9, line 55, delete "2" and insert --1--.

Column 10, line 33, delete "in" and insert --on--;

UNITED STATES PATENT OFFICE
CERTIFICATE OF CORRECTION

Patent No. 4,019,817  Dated April 26, 1977

Inventor(s) Kazuya Matsumoto

It is certified that error appears in the above-identified patent and that said Letters Patent are hereby corrected as shown below:

Column 10, line 48, "recroding" to read -- recording --.

Signed and Sealed this

First Day of November 1977

[SEAL]

Attest:

RUTH C. MASON
Attesting Officer

LUTRELLE F. PARKER
Acting Commissioner of Patents and Trademarks